A. AND J. ALDI.
VALVE GRINDER.
APPLICATION FILED APR. 17, 1922.
1,428,871.
Patented Sept. 12, 1922.
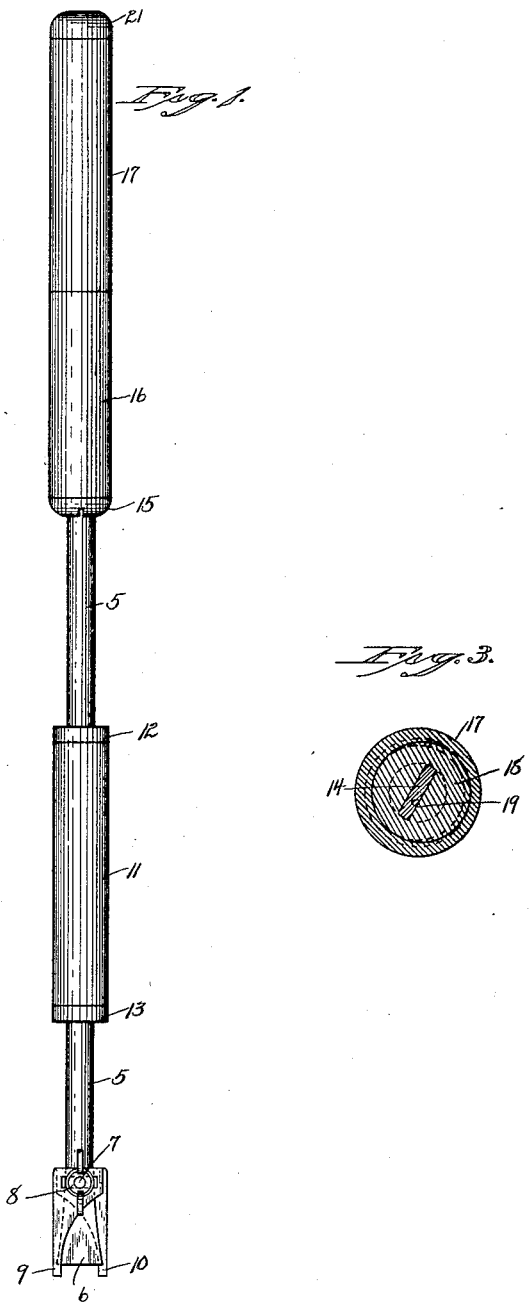
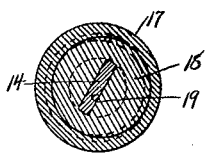
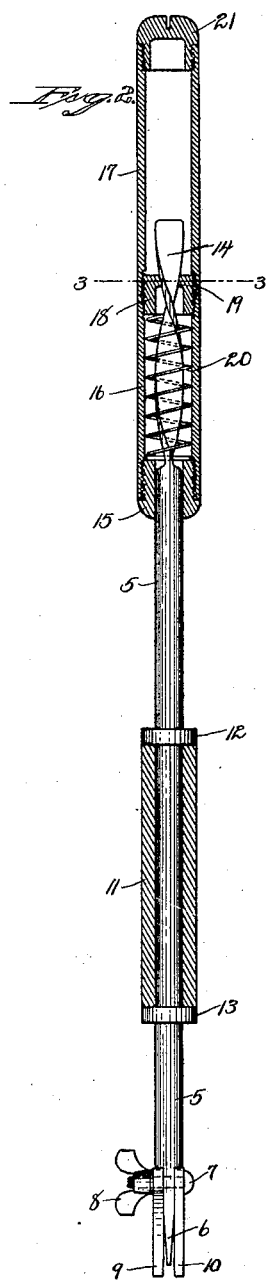
Inventors
Angelo Aldi
and Joseph Aldi
by Seymour Earle
atty Patented Sept. 12, 1922.

1,428,871

UNITED STATES PATENT OFFICE.

ANGELO ALDI AND JOSEPH ALDI, OF SOUTHINGTON, CONNECTICUT.

VALVE GRINDER.

Application filed April 17, 1922. Serial No. 554,077.

*To all whom it may concern:*

Be it known that we, ANGELO ALDI and JOSEPH ALDI, citizens of the United States, residing at Southington, in the county of Hartford and State of Connecticut, have invented a new and useful Improvement in Valve Grinders; and we do hereby declare the following, when taken in connection with the accompanying drawings and the characters of reference marked thereon, to be a full, clear, and exact description of the same, and which said drawings constitute part of this application, and represent, in—

Fig. 1 a face view of a valve grinder constructed in accordance with our invention.

Fig. 2 a side view, partly in section, of the same.

Fig. 3 a sectional view on the line 3—3 of Fig. 2 enlarged.

This invention relates to improvement in valve grinders, that is, tools adapted to grip the top of a valve to turn the same in its seat, these devices being particularly adapted for use in grinding valves in motors. In grinding valves it is desirable that the valve be oscillated and gradually rotated, the object of this invention being to provide a simple device by which the valve may be readily and properly manipulated, and the invention consists in the construction as hereinafter described and particularly recited in the claims.

In carrying out our invention, we employ a tool shank 5, formed at its lower end with a blade 6 and similar to the point of an ordinary screw-driver. On opposite sides of the shank, and adjustably connected therewith by a bolt 7 and wing-nut 8, are two gripping fingers 9 and 10, which are adapted for use in turning a valve provided with spot-holes, whereas, the blade 6 is adapted for turning valves, which are provided with a transverse slot or nick. On the shank, and free to turn thereon, is a tubular grip 11, secured in place between collars 12 and 13. The outer end 14 of the shank is flattened and twisted and is passed through a tubular bushing 15, located in the lower end of the inner handle-member 16, which, in turn, is connected with the outer end 17 of the handle, the two parts 16 and 17 being connected by an externally threaded nut 18. This nut has a transverse slot 19, through which the twisted end of the shank extends, and around the shank, between the plug 15 and the inner end of the nut 18, is a spring 20, and the outer end of the handle is closed by a screw-plug 21.

In operation, the lower end of the shank is engaged with the top of a valve, either by means of the blade 6 or the fingers 9 and 10, which may be adjusted for various sizes of valves. The grip 11 is held by one hand, so as to guide the tool, and the handle comprising the members 16 and 17 is forced downward, moving the nut 18 over the twisted end of the stem, which is thereby caused to turn, so as to move the valve in one direction. The handle is then pulled outward, so as to reverse the movement of the stem, which, of course, turns the valve in the opposite direction, and by gradually rotating the handle, the movement of the valve is progressive, that is, it moves back and forth by each complete operation of the device, and is gradually turned between the successive operations. The withdrawal of the shank from the handle is prevented by a transverse pin 22, which comes to a bearing on the inner end of the tubular plug 15.

We claim:

1. A valve grinder, comprising a shank provided at its lower end with valve-gripping means, the outer end of the shank flattened and twisted, a two-part handle into which the said stem extends, the two parts being connected together by a nut having a transverse slot through which the shank extends, a tubular plug in the inner end of the handle, forming a guide for said shank, a spring between the said tubular plug and nut, and a plug inserted into the outer end of the handle.

2. A valve grinder, comprising a shank provided at its lower end with valve-gripping means, the outer end of the shank flattened and twisted, a two-part handle into which the said stem extends, the two parts being connected together by a nut having a transverse slot through which the shank extends, a tubular plug in the inner end of the handle, forming a guide for said shank, and a spring between the said tubular plug and nut.

3. A valve grinder, comprising a shank provided at its lower end with valve-gripping means, a tubular grip mounted on said shank and limited to longitudinal movement, the outer end of the shank flattened and twisted, a two-part handle into which the said stem extends, the two parts being connected together by a nut having a transverse slot through which the shank extends, a tubular plug in the inner end of the handle, forming a guide for said shank, a spring between the said tubular plug and nut, and a plug inserted into the outer end of the handle.

In testimony whereof, we have signed this specification in the presence of two subscribing witnesses.

ANGELO ALDI.
JOSEPH ALDI.

Witnesses:
WILLIAM J. HURLEY,
EDMUND J. QUINLAN.